(12) United States Patent
Konishi (10) Patent No.: US 11,586,003 B2
(45) Date of Patent: Feb. 21, 2023

(54) LENS APPARATUS AND IMAGE PICKUP APPARATUS

(71) Applicant: CANON KABUSHIKI KAISHA, Tokyo (JP)

(72) Inventor: Yusuke Konishi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 17/150,100

(22) Filed: Jan. 15, 2021

(65) Prior Publication Data

US 2021/0223502 A1    Jul. 22, 2021

(30) Foreign Application Priority Data

Jan. 22, 2020    (JP) .............................. JP2020-008023

(51) Int. Cl.
  *G02B 7/02*    (2021.01)
  *G02B 7/04*    (2021.01)
(52) U.S. Cl.
  CPC .............. *G02B 7/04* (2013.01); *G02B 7/021* (2013.01)
(58) Field of Classification Search
  CPC ................................. G02B 7/04; G02B 7/021
  USPC .................................. 359/694–706, 822–826
  See application file for complete search history.

(56) References Cited

U.S. PATENT DOCUMENTS

| | | | | |
|---|---|---|---|---|
| 4,193,667 A | * | 3/1980 | Yasukuni | ............. G02B 15/144 352/85 |
| 4,923,281 A | * | 5/1990 | Krichever | ................ G02B 7/04 359/826 |
| 5,966,248 A | * | 10/1999 | Kurokawa | ............... G02B 7/08 359/696 |
| 6,104,551 A | * | 8/2000 | Matsui | ..................... G02B 7/10 359/689 |
| 2003/0174412 A1 | * | 9/2003 | Noguchi | ................ G02B 7/102 359/694 |
| 2007/0019100 A1 | * | 1/2007 | Mitani | ................... G02B 7/023 348/335 |
| 2017/0115467 A1 | * | 4/2017 | Tanaka | ................. G02B 15/143 |

FOREIGN PATENT DOCUMENTS

| | | | |
|---|---|---|---|
| CN | 105700154 A | * | 6/2016 |
| JP | 11326734 A | | 11/1999 |
| JP | 2000180689 A | | 6/2000 |

* cited by examiner

*Primary Examiner* — Mahidere S Sahle
(74) *Attorney, Agent, or Firm* — Carter, DeLuca & Farrell LLP (57) ABSTRACT

Provided is a lens apparatus, including: a fixed barrel; a first optical member supported by the fixed barrel and configured to be driven in a direction of an optical axis; a second optical member supported by the fixed barrel and undriven in the direction of the optical axis; a driving mechanism supported by the fixed barrel and configured to be rotated about the optical axis and drive the first optical member in the direction of the optical axis; and a first elastic member arranged between the first optical member and the second optical member and configured to apply an elastic force in the direction of the optical axis to the first optical member and the second optical member.

8 Claims, 7 Drawing Sheets

LENS APPARATUS AND IMAGE PICKUP APPARATUS

BACKGROUND OF THE INVENTION

Field of the Invention

The present invention relates to a lens apparatus and an image pickup apparatus.

Description of the Related Art

Hitherto, there has been known a lens apparatus configured to perform focusing, zooming, and light amount adjustment by moving an optical element such as a support frame configured to support a lens in an optical axis direction with a cam mechanism. The cam mechanism may have a structure in which a cam pin fixed to the support frame is slidably engaged with a cam groove formed in an inner peripheral surface of a cam barrel. When the cam barrel is rotated with respect to a fixed barrel, the support frame can be moved forward and rearward along the cam groove inside the cam barrel.

Meanwhile, tilt of the support frame or a change in distance between the support frame and a member in the periphery thereof may occur depending on a rotating direction of the cam barrel due to play (also referred to as "backlash") between the cam groove and the cam pin. Further, when the cam barrel is rotated with use of an operation ring, a posture of the cam barrel with respect to the fixed barrel may also be changed due to backlash between the cam barrel and the fixed barrel. Thus, for the lens apparatus that is required to have particularly high optical performance, there is a growing demand for a structure for reducing the above-mentioned tilt, change in distance, and change in posture regardless of the rotating direction of the cam barrel.

In Japanese Patent Application Laid-Open No. H11-326734, there is disclosed a structure for reducing tilt of zoom lens units by providing a plurality of spring members between two kinds of zoom lens units and equalizing urging forces applied to cam pins included in the two kinds of zoom lens units, respectively, to reduce backlash between the cam grooves and the cam pins. In Japanese Patent Application Laid-Open No. 2000-180689, there is disclosed a structure for reducing a change in posture of a cam ring by providing spring members configured to urge the cam ring along an optical axis direction between a fixed barrel and the cam ring.

With the structures disclosed in Japanese Patent Application Laid-Open No. H11-326734 and Japanese Patent Application Laid-Open No. 2000-180689, however, both of backlash of the support frame and backlash of the cam barrel cannot be reduced. Meanwhile, when structures for reducing the backlash are individually mounted, a structure may be complicated.

An aspect of embodiments provides, for example, a lens apparatus beneficial in reduction of play of a support frame and a cam barrel.

SUMMARY OF THE INVENTION

An aspect of embodiments provides a lens apparatus including: a fixed barrel; a first optical member supported by the fixed barrel and configured to be driven in a direction of an optical axis; a second optical member supported by the fixed barrel and configured not to be driven in the direction of the optical axis; a driving mechanism supported by the fixed barrel and configured to be rotated about the optical axis and drive the first optical member in the direction of the optical axis; and a first elastic member arranged between the first optical member and the second optical member and configured to apply an elastic force in the direction of the optical axis to the first optical member and the second optical member.

Further features of the present invention will become apparent from the following description of exemplary embodiments with reference to the attached drawings.

DESCRIPTION OF THE EMBODIMENTS

Now, exemplary embodiments of the present invention are described in detail based on the attached drawings.

First Embodiment

A backlash suppression structure according to a first embodiment is now described with reference to FIG. 1 to FIG. 6.

Figure 1:
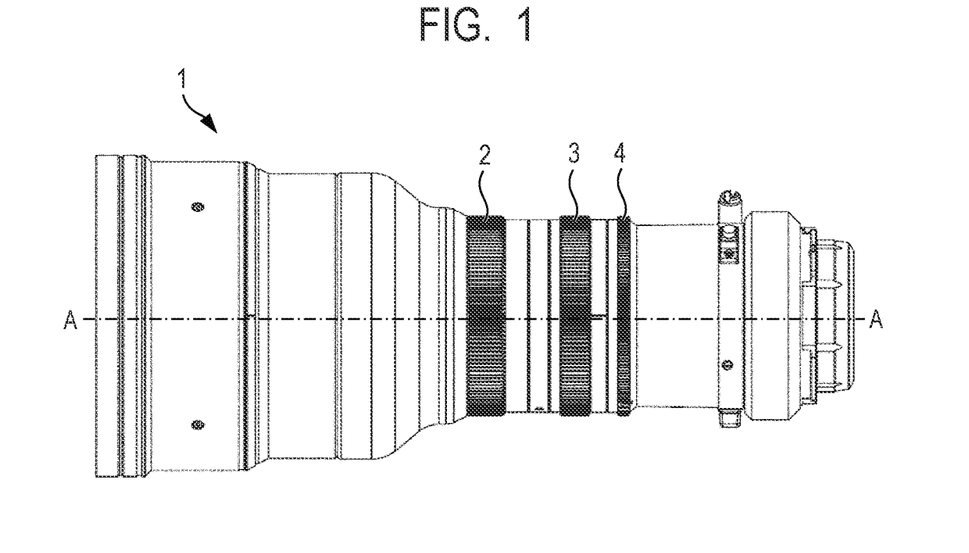
FIG. 1 is a configuration view of a whole zoom lens system in a first embodiment.
Figure 2:
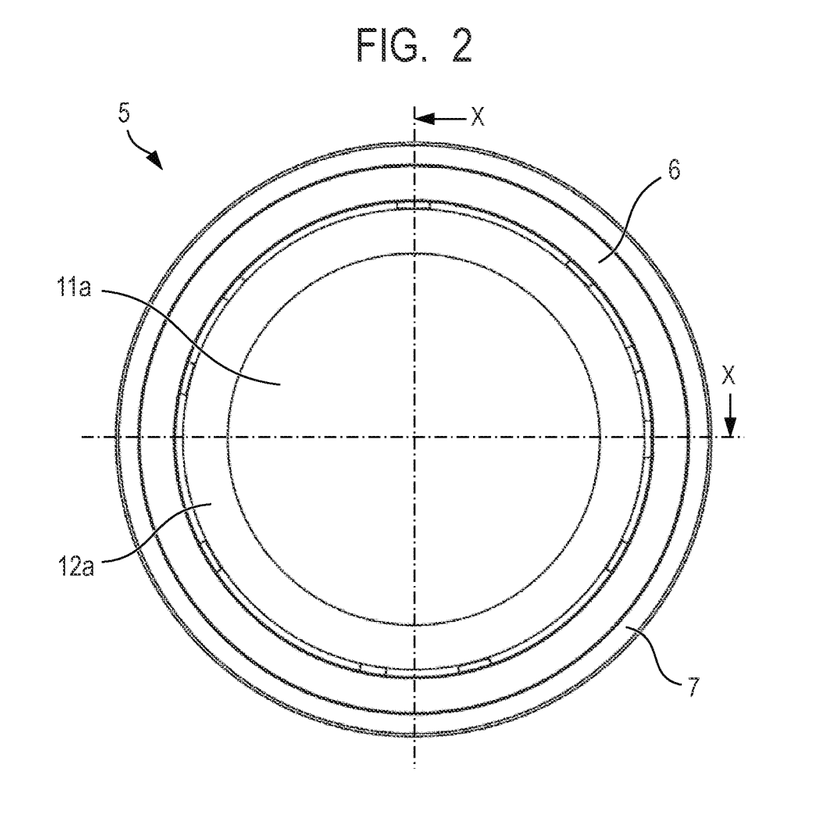
FIG. 2 is a front view of a backlash suppression structure in the first embodiment.
Figure 3:
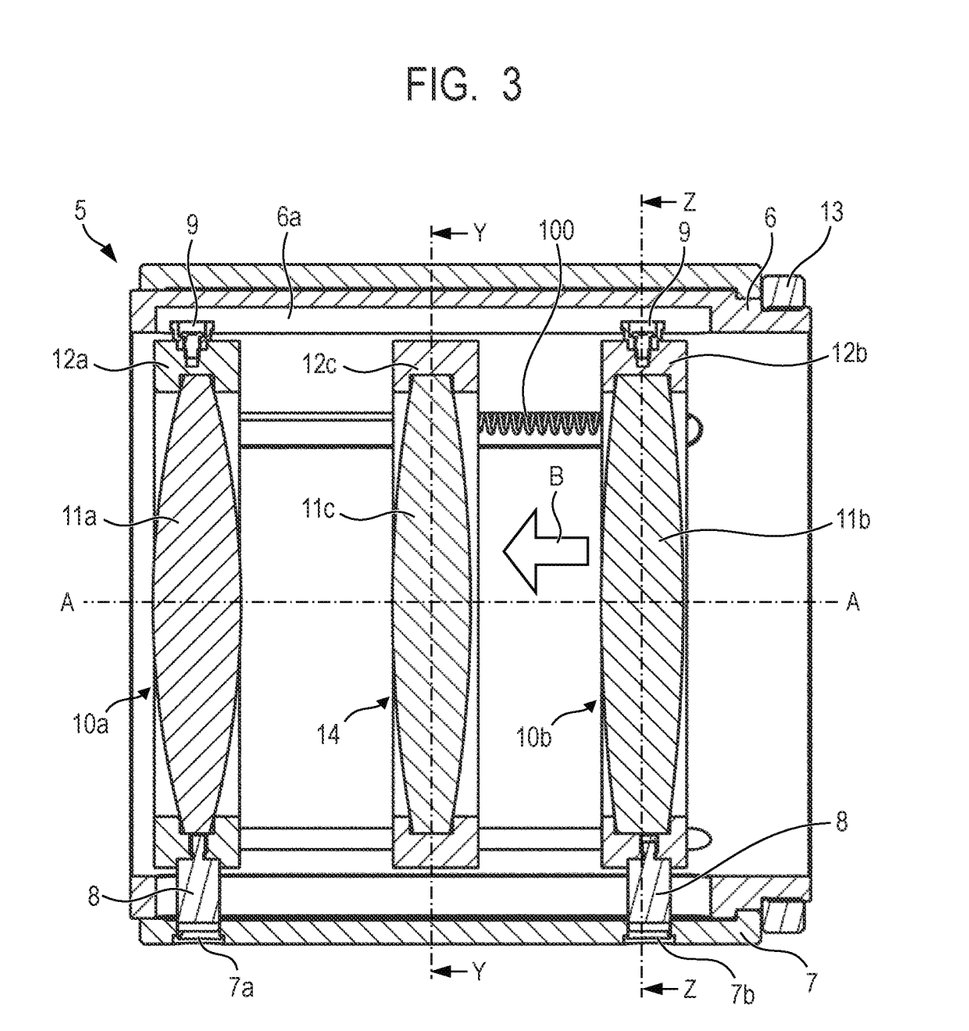
FIG. 3 is a sectional view of the backlash suppression structure in the first embodiment, which is taken along the lines X.
Figure 4:
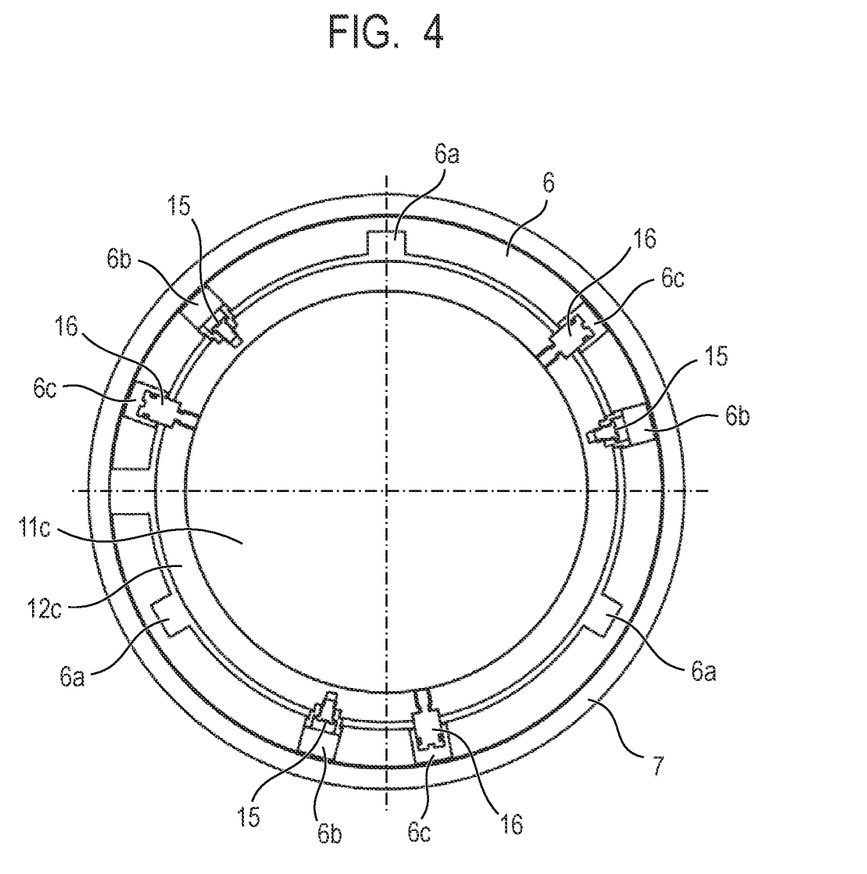
FIG. 4 is a sectional view of the backlash suppression structure in the first embodiment, which is taken along the line Y-Y.
Figure 5:
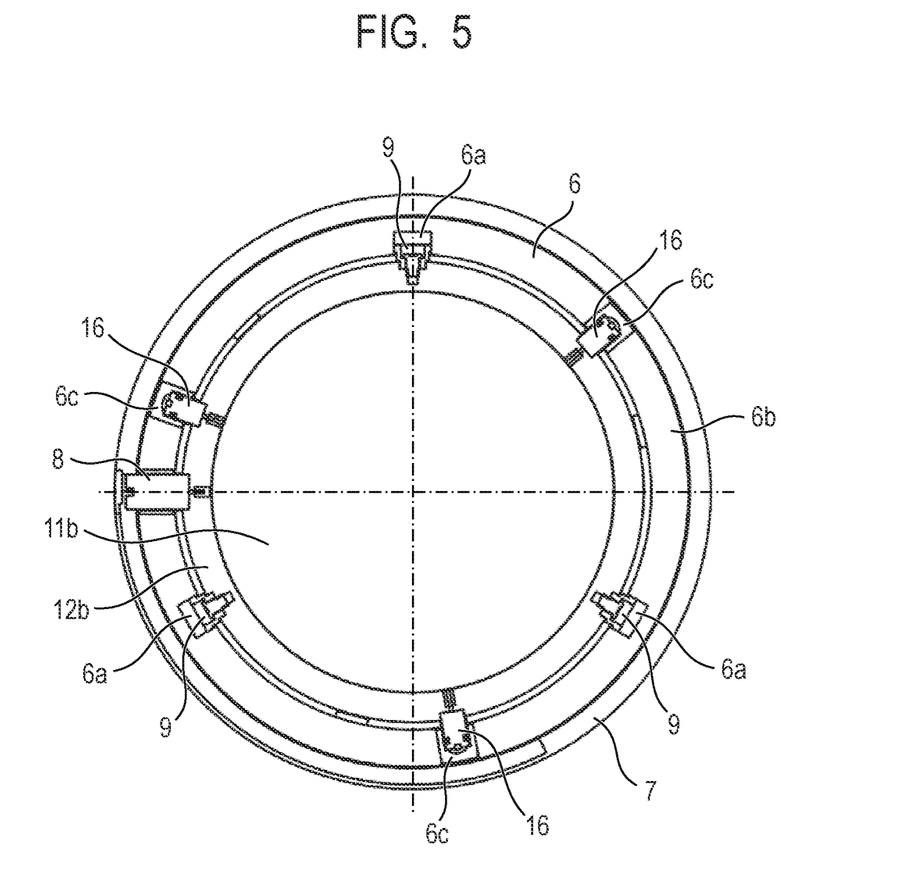
FIG. 5 is a sectional view of the backlash suppression structure in the first embodiment, which is taken along the line Z-Z.
Figure 6:
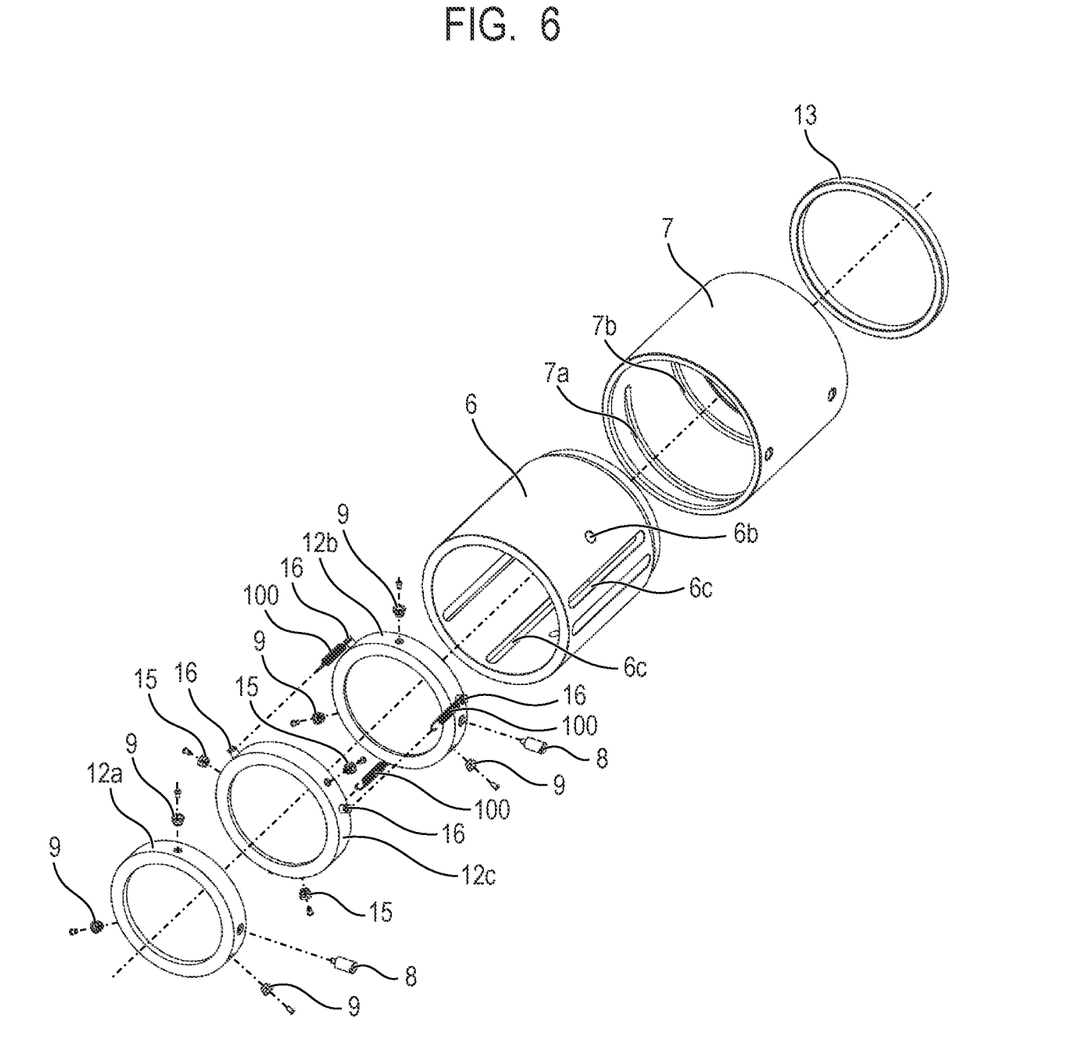
FIG. 6 is an exploded perspective view of the backlash suppression structure in the first embodiment.

FIG. 1 is a view for illustrating a configuration of a whole zoom lens system, and FIG. 2 is a front view of a backlash suppression structure in a first embodiment. FIG. 3 is a sectional view of the backlash suppression structure in the first embodiment, which is taken along the lines X. FIG. 4 is a sectional view of the backlash suppression structure in the first embodiment, which is taken along the line Y-Y. FIG. 5 is a sectional view of the backlash suppression structure in the first embodiment, which is taken along the line Z-Z. FIG. 6 is an exploded perspective view of the backlash suppression structure in the first embodiment.

The lens apparatus 1 includes a focus operation ring 2, a zoom operation ring 3, and a diaphragm operation ring 4, which are provided on a radially outer side thereof. Through a rotational operation of the focus operation ring 2 or the zoom operation ring 3, the lens apparatus 1 moves movable optical units (not shown in FIG. 1) in a direction of an optical axis A to positions in accordance with a rotation angle to thereby perform focus adjustment or zoom adjustment. Further, through a rotational operation of the diaphragm operation ring 4, the lens apparatus 1 can change an aperture diameter in accordance with a rotation angle to thereby enable light amount adjustment.

Next, a cam mechanism unit (driving mechanism) 5, which is an internal structure of the lens apparatus 1, is described. The cam mechanism unit 5 has a cam structure using a fixed barrel 6, a cam barrel 7, cam pins 8, and straight groove pins 9. The fixed barrel 6 has straight grooves 6*a* extending in the optical axis direction. The cam barrel 7 has cam grooves 7*a* and 7*b*.

The cam barrel 7 is held by a cam stop ring 13 so as to be rotatable about the optical axis on an outer periphery of the fixed barrel 6. Movable optical units 10*a* and 10*b* (third optical member and first optical member) include lenses 11*a* and 11*b* and support frames 12*a* and 12*b* configured to support the lenses 11*a* and 11*b*, respectively. The cam barrel 7 that is rotatable about the optical axis is rotated with respect to the fixed barrel 6 to thereby position the lenses 11*a* and 11*b* in the direction of the optical axis A.

The support frames 12*a* and 12*b* each include the cam pin 8 and the straight groove pins 9 provided around the optical axis A. The cam pins 8 are engaged with the cam grooves 7*a* and 7*b*, respectively, and the straight groove pins 9 are engaged with the straight grooves 6*a*. The straight groove pins 9 are fixed to the support frames 12*a* and 12*b* with screws. When the cam barrel 7 is rotated relative to the fixed barrel 6, the support frames 12*a* and 12*b* are not rotated with respect to the fixed barrel 6 due to the engagement between the straight grooves 6*a* and the straight groove pins 9, and are moved in the optical axis direction along a cam shape due to the engagement between the cam pins 8 and the cam grooves 7*a* and 7*b*. In this case, with arrangement of the straight grooves 6*a* and the straight groove pins 9 at three substantially equiangular positions in a circumferential direction having the optical axis A as a center, postures of the movable optical units 10*a* and 10*b* are maintained.

In this embodiment, the cam barrel 7 is held on the outer periphery of the fixed barrel 6 so as to be rotatable about the optical axis. However, the structure of holding the cam barrel 7 is not limited to the above-mentioned structure. The cam barrel 7 may be rotatably held on a radially inner side of the fixed barrel 6. Further, the cam pins 8 and the straight groove pins 9 are separately provided. However, pins used in the cam mechanism unit 5 are not limited to the cam pins 8 and the straight groove pins 9. The cam mechanism unit 5 may be driven with pins that are engaged with both of the straight grooves 6*a* and the cam grooves 7*a* and 7*b*.

The fixed barrel 6 is configured to hold a fixed optical unit 14 (second optical member) between the movable optical units 10*a* and 10*b*. The fixed optical unit 14 includes a lens 11*c* and a support frame 12*c* configured to support the lens 11*c*. The support frame 12*c* includes a plurality of fixing pins (roller members) 15. The plurality of fixing pins 15 are arranged at three substantially equiangular positions in the circumferential direction having the optical axis A as the center so as to extend radially outward from an outer periphery of the support frame 12*c*. The fixing pins 15 are engaged with fixing holes 6*b* formed in the fixed barrel 6. With the arrangement of the fixing pins 15 at the three substantially equiangular positions in the circumferential direction having the optical axis A as the center, a posture of the fixed optical unit 14 is maintained.

In this embodiment, as a method of fixing the fixed optical unit 14 to the fixed barrel 6, a roller suspension structure in which the fixing pins 15 are fixed to the fixed optical unit 14 with screws is employed. A structure in which the fixed optical unit 14 is fixed to the fixed barrel 6 with, for example, screws may also be employed. However, in order to prevent an increase in size of the cam mechanism unit 5 due to a fixing portion for the fixed barrel 6 and achieve a simple structure, the roller suspension structure described in this embodiment is preferred.

Next, a configuration of the backlash suppression structure provided to the cam mechanism unit 5 is described. Spring members (elastic members; first elastic members) 100 are provided between the support frame 12*b* and the support frame 12*c*. The spring members 100 are fixed in a stretchable and contractable manner to spring shafts 16 which are provided to the support frame 12*b* and the support frame 12*c*, and are placed in spring grooves 6*c* of the fixed barrel 6. The spring members 100 are arranged at three substantially equiangular positions in the circumferential direction having the optical axis A as the center so that urging forces of the spring members 100 are equally applied. In this structure, the cam pin 8 provided to the support frame 12*b* is shifted to one side inside the cam groove 7*b*.

In this embodiment, the spring members 100 are described as tension springs each being configured to apply a tensile force. However, the spring members 100 are not limited to the tension springs. The spring members 100 are only required to have an urging force for shifting the support frame 12*b* toward the support frame 12*c*, and may be, for example, compression springs, each being configured to apply a compressive force. Further, the spring members (elastic members) 100 are arranged at the three positions. However, the arrangement of the spring members 100 is not limited to the above-mentioned arrangement. Any arrangement that allows the cam pin 8 provided to the support frame 12*b* to be shifted to one side inside the cam groove 7*b* may be used.

A method of suppressing backlash between the cam barrel 7 and the support frame 12*b* in the above-mentioned configuration is described. The support frame 12*c* is fixed with respect to the fixed barrel 6 with the fixing pins 15 provided at the three positions. The support frame 12*b* is supported so as to be movable in the direction of the optical axis A with respect to the fixed barrel 6 through the engagement between the straight groove pins 9 and the straight grooves 6*a*. The cam barrel 7 is held so as to be rotatable with respect to the fixed barrel 6 while movement thereof in the direction of the optical axis A with respect to the fixed barrel 6 is restricted. When the cam barrel 7 is rotated with respect to the fixed barrel 6, the support frame 12*b* is driven in the direction of the optical axis A along a locus of the cam groove 7*b* through engagement between the cam pin 8 and the cam groove 7*b*.

In this case, the support frame 12*b* is urged in a direction indicated by an arrow B by the spring members 100. Thus, the cam pin 8 provided to the support frame 12*b* is pressed against an inner wall of the cam groove 7*b*, which is located on a side in the direction indicated by the arrow B. As a result, backlash between the cam pin 8 and the cam groove 7*b* can be suppressed. Further, the cam pin 8 is engaged with the cam groove 7*b* of the cam barrel 7, and thus the cam barrel 7 is urged in the direction indicated by the arrow B with respect to the support frame 12*c* through the cam pin 8 provided to the support frame 12*b*. Thus, backlash between the fixed barrel 6 and the cam barrel 7 can be suppressed.

The movable optical units and the fixed optical unit, each consisting of one lens, have been exemplified. However, each of the movable optical units and the fixed optical unit is not limited to the optical unit including one lens. The optical unit may include a plurality of lenses, or may include other optical elements such as a diaphragm in addition to the lens.

An image pickup apparatus including the lens apparatus according to the present invention and an image pickup element configured to pick up an image formed by the lens apparatus, which enjoys the effects of the present invention, can be achieved.

Second Embodiment

Figure 7:
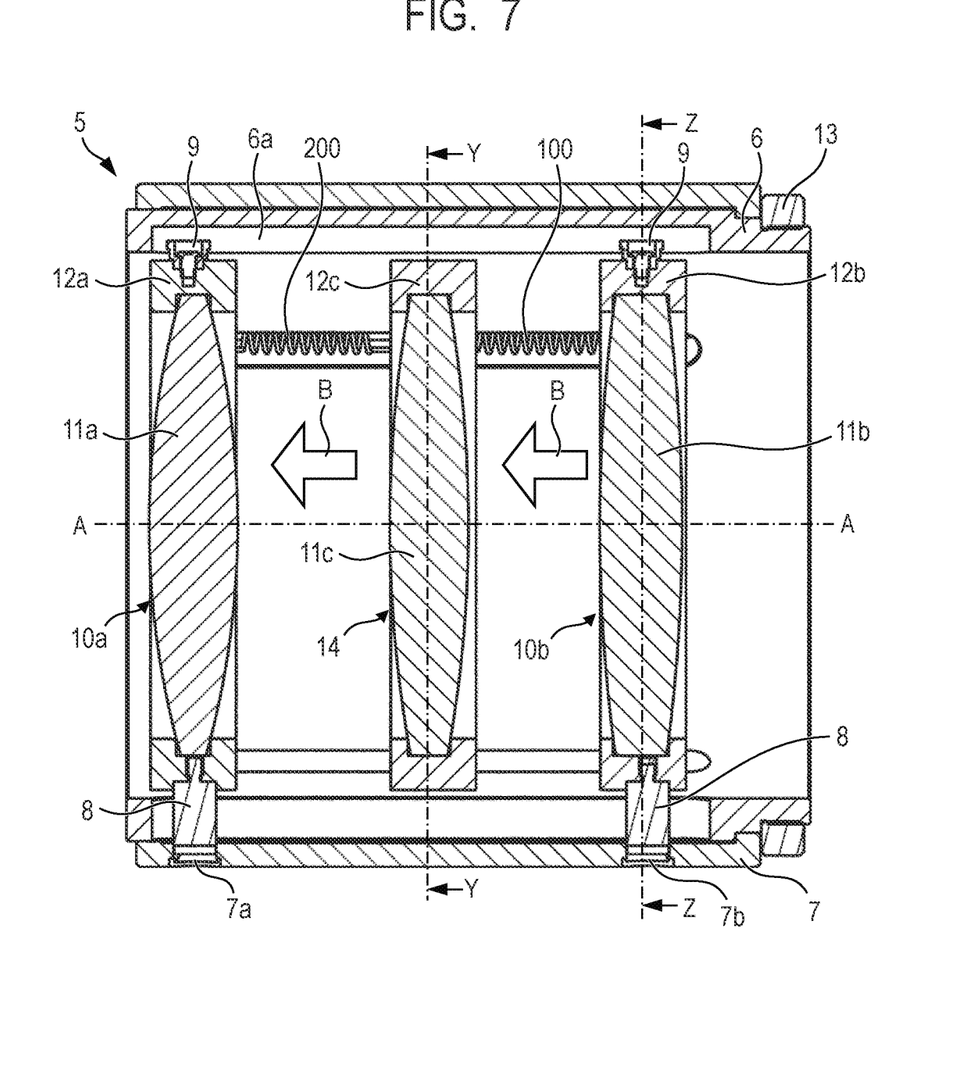
FIG. 7 is a sectional view of a backlash suppression structure in a second embodiment, which is taken along the lines X.

A backlash suppression structure according to a second embodiment is now described with reference to FIG. 7. FIG. 1 is a view for illustrating a configuration of a whole zoom lens system, and FIG. 2 is a front view of the backlash suppression structure in the second embodiment. FIG. 7 is a sectional view of the backlash suppression structure in the second embodiment, which is taken along the lines X.

The backlash suppression structure in the second embodiment includes, in addition to the configuration according to the first embodiment, which is illustrated in FIG. 3, spring members (elastic members; second elastic members) 200. The spring members 200 are provided between the support frame 12a (movable optical unit 10a; third optical member), which is arranged on the side opposite to the support frame 12b with respect to the support frame 12c in the optical axis direction, and the support frame 12c. The spring members 200 are compression springs, and are each configured to apply a force for urging the support frame 12a in the direction indicated by the arrow B with respect to the support frame 12c.

In this embodiment, the spring members 200 are described as the compression springs. However, the spring members 200 are not limited to the compression springs. The spring members 200 are only required to have the same urging direction as an urging direction of the spring members 100 with respect to the support frame 12c. Thus, when the spring members 100 are compression springs, the spring members 200 are only required to be tension springs.

A method of suppressing backlash among the cam barrel 7, the support frame 12a, and the support frame 12b in the above-mentioned configuration is described. The cam pin 8 provided to the support frame 12a is urged in the direction indicated by the arrow B with respect to an inner wall of the cam groove 7a by the spring members 200. As a result, backlash between the cam pin 8 and the cam groove 7a can be suppressed.

Further, the cam pins 8 are engaged with the cam barrel 7. Thus, the cam barrel 7 can be urged in the direction indicated by the arrows B with respect to the support frame 12c through the cam pins 8 provided to the support frames 12a and 12b. A resultant force of the forces of the spring members 100 and the forces of the spring members 200 is applied to the cam barrel 7 to thereby enable suppression of backlash between the fixed barrel 6 and the cam barrel 7. Thus, backlash of the plurality of support frames can also be suppressed. The other reference symbols and configurations are the same as those of the first embodiment, and thus description thereof is omitted.

Third Embodiment

Figure 8:
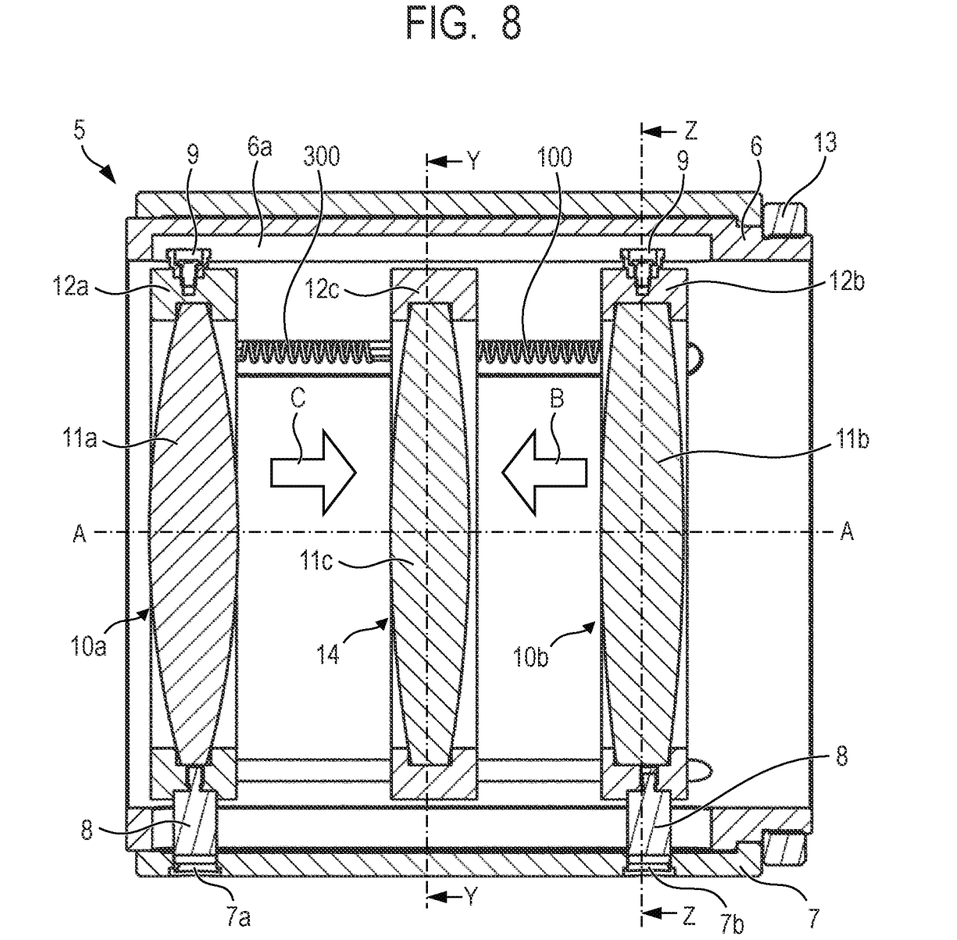
FIG. 8 is a sectional view of a backlash suppression structure in a third embodiment, which is taken along the lines X.

A backlash suppression structure according to a third embodiment is now described with reference to FIG. 8. FIG. 1 is a view for illustrating a configuration of a whole zoom lens system, and FIG. 2 is a front view of the backlash suppression structure in the third embodiment. FIG. 8 is a sectional view of the backlash suppression structure in the third embodiment, which is taken along the lines X.

The backlash suppression structure in the third embodiment includes, in addition to the configuration according to the first embodiment, which is illustrated in FIG. 3, spring members (elastic members; second elastic members) 300. The spring members 300 are provided between the support frame 12a and the support frame 12c. The spring members 300 are tension springs, and are each configured to apply a force for urging the support frame 12a in a direction indicated by an arrow C with respect to the support frame 12c.

In this embodiment, the spring members 300 are described as the tension springs. However, the spring members 300 are not limited to the tension springs. A direction of a resultant force of the urging forces of the spring members 100 and the urging forces of the spring members 300 on the support frame 12c is only required to be always constant within a range in which the support frames 12a and 12b are driven. Specifically, elastic forces of the spring members 100 and the spring members 300 are only required to be adjusted so that the direction of the resultant force of the urging forces of the spring members 100 and the urging forces of the spring members 300 on the support frame 12c becomes always constant over a movable range of the movable lenses.

According to the configuration described above, the support frame 12c and the cam barrel 7 are always urged in a given direction. Thus, an anti-backlash direction does not change within the range in which the support frames 12a and 12b are driven. Further, the urging forces applied to the cam barrel 7 can be alleviated. Thus, backlash of the plurality of support frames can be suppressed, and an increase in torque for rotating the cam barrel 7, which may be caused by the urging forces on the cam barrel 7, can be suppressed in comparison to a case in which urging directions of two kinds of spring members on the support frame 12c are the same. The other reference symbols and configurations are the same as those of the first embodiment and the second embodiment, and thus description thereof is omitted.

The present invention is applicable to, for example, a zoom lens unit, a focus lens unit, or a macro lens unit as the movable optical unit.

According to the present invention, a lens apparatus advantageous in, for example, reduction of the backlash of the support frames and the cam barrel can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-008023, filed Jan. 22, 2020, which is hereby incorporated by reference herein in its entirety.

What is claimed is:
1. A lens apparatus comprising:
a fixed barrel;
a first optical member supported by the fixed barrel and configured to be driven in a direction of an optical axis;
a second optical member supported by the fixed barrel and configured not to be driven in the direction of the optical axis;
a third optical member arranged on a side opposite to the first optical member with respect to the second optical member in the direction of the optical axis, supported by the fixed barrel, and configured to be driven in the direction of the optical axis;

a driving mechanism supported by the fixed barrel and configured to be rotated about the optical axis and drive the first optical member and the third optical member in the direction of the optical axis;

a first elastic member arranged between the first optical member and the second optical member and configured to apply a first elastic force in the direction of the optical axis to the first optical member and the second optical member; and a second elastic member arranged between the third optical member and the second optical member and configured to apply a second elastic force in the direction of the optical axis to the third optical member and the second optical member, wherein a direction of an urging force applied via the first elastic force and the second elastic force to the driving mechanism is unchanged by a rotation of the driving mechanism.

2. The lens apparatus according to claim 1, wherein the second optical member includes a plurality of roller members arranged around the optical axis, and is supported by the fixed barrel via the plurality of roller members.

3. The lens apparatus according to claim 1, wherein the first elastic member is configured to apply a tensile force to the first optical member and the second optical member, and wherein the second elastic member is configured to apply a compressive force to the third optical member and the second optical member.

4. The lens apparatus according to claim 1, wherein an elastic force applied by the first elastic member to the second optical member and an elastic force applied by the second elastic member to the third optical member have directions same as each other.

5. The lens apparatus according to claim 1, further comprising:

wherein an elastic force applied by the first elastic member to the second optical member and an elastic force applied by the second elastic member to the third optical member have directions and magnitudes different from each other.

6. The lens apparatus according to claim 1, wherein the first optical member includes one of a zoom lens unit, a focus lens unit, and a macro lens unit.

7. The lens apparatus according to claim 1, wherein the driving mechanism includes a cam mechanism.

8. An image pickup apparatus comprising:

a lens apparatus comprising:

a fixed barrel;

a first optical member supported by the fixed barrel and configured to be driven in a direction of an optical axis;

a second optical member supported by the fixed barrel and configured not to be driven in the direction of the optical axis;

a third optical member arranged on a side opposite to the first optical member with respect to the second optical member in the direction of the optical axis, supported by the fixed barrel, and configured to be driven in the direction of the optical axis;

a driving mechanism supported by the fixed barrel and configured to be rotated about the optical axis and drive the first optical member and the third optical member in the direction of the optical axis;

a first elastic member arranged between the first optical member and the second optical member and configured to apply a first elastic force in the direction of the optical axis to the first optical member and the second optical member; and a second elastic member arranged between the third optical member and the second optical member and configured to apply a second elastic force in the direction of the optical axis to the third optical member and the second optical member, wherein a direction of an urging force applied via the first elastic force and the second elastic force to the driving mechanism is unchanged by a rotation of the driving mechanism; and an image pickup element configured to pick up an image formed by the lens apparatus.

* * * * *